US011065587B2

(12) United States Patent
Kosar et al.

(10) Patent No.: US 11,065,587 B2
(45) Date of Patent: Jul. 20, 2021

(54) LONG CHAIN BRANCHED FLUOROPOLYMER MEMBRANES

(71) Applicant: Arkema Inc., King of Prussia, PA (US)

(72) Inventors: Walter P. Kosar, Pottstown, PA (US); Lotfi Hedhli, Noisy le Roi (FR); Roderick Reber, III, Maple Glen, PA (US)

(73) Assignee: Arkema Inc., King of Prussia, PA (US)

( * ) Notice: Subject to any disclaimer, the term of this patent is extended or adjusted under 35 U.S.C. 154(b) by 304 days.

(21) Appl. No.: 14/770,125

(22) PCT Filed: Feb. 27, 2014

(86) PCT No.: PCT/US2014/018882
§ 371 (c)(1),
(2) Date: Aug. 25, 2015

(87) PCT Pub. No.: WO2014/137721
PCT Pub. Date: Sep. 12, 2014

(65) Prior Publication Data
US 2016/0008772 A1    Jan. 14, 2016

Related U.S. Application Data

(60) Provisional application No. 61/771,999, filed on Mar. 4, 2013.

(51) Int. Cl.
*B01D 71/34* (2006.01)
*B01D 69/02* (2006.01)
(Continued)

(52) U.S. Cl.
CPC ......... *B01D 71/34* (2013.01); *B01D 67/0016* (2013.01); *B01D 69/02* (2013.01);
(Continued)

(58) Field of Classification Search
CPC ....................................................... B01D 71/34
See application file for complete search history.

(56) References Cited

U.S. PATENT DOCUMENTS 6,413,621 B1 *  7/2002  Mayes ............... B01D 67/0011
                                                428/212
7,514,480 B2   4/2009  Mekhilef et al.
(Continued)

FOREIGN PATENT DOCUMENTS

JP    2002348389    12/2002
JP    2003082129     3/2003
(Continued)

OTHER PUBLICATIONS

Mekhilef et al. ("Branched PVDF Gains Melt Strength for Film, Blow Molding, Thermofolding". Article [online]. Plastics Technology, Oct. 1, 2007 [accessed Dec. 20, 2017]: <URL: https://www.ptonline.com/articles/branched-pvdf-gains-melt-strength-for-film-blow-molding-thermoforming>) (Year: 2007).*
(Continued)

*Primary Examiner* — Ryan B Huang
(74) *Attorney, Agent, or Firm* — Joanne Rossi

(57) ABSTRACT

The invention relates to membranes formed from long chain branched fluoropolymers, and especially long chain branched homopolymers and copolymers of polyvinylidene fluoride such as KYNAR resins. The novel membranes retain all the advantages of a fluoropolymer membrane (excellent chemical resistance especially to strong acids and oxidizing agents, and good mechanical strength), and additionally offer improved permeability, improved strain hardening, and even better resistance to caustic attacks. The improvements are believed to be related to an improvement to the microstructure of the membranes, producing a more open structure due to the long chain branched fluoropoly-
(Continued)

SEM cross sections for unsupported flat sheet membranes

Linear PVDF 1 membrane

LCB-PVDF1 membrane mers. Further improvements in the mechanical properties of the membranes can be induced by strain hardening.

15 Claims, 3 Drawing Sheets

(51) Int. Cl.
*B01D 67/00* (2006.01)
*B01D 69/06* (2006.01)
*B01D 69/08* (2006.01)

(52) U.S. Cl.
CPC ............. *B01D 69/06* (2013.01); *B01D 69/08* (2013.01); *B01D 2325/04* (2013.01); *B01D 2325/24* (2013.01); *B01D 2325/30* (2013.01); *C08L 2205/025* (2013.01)

(56) References Cited

U.S. PATENT DOCUMENTS

| | | |
|---|---|---|
| 8,557,938 B2 | 10/2013 | Hedhli et al. |
| 2004/0192868 A1 | 9/2004 | Kaspar et al. |
| 2006/0287409 A1 | 12/2006 | Mekhilef et al. |
| 2007/0106010 A1* | 5/2007 | Hedhli .................. C08F 14/18 524/544 |
| 2010/0133482 A1* | 6/2010 | Abusleme .............. B01D 69/02 252/511 |
| 2010/0168330 A1* | 7/2010 | Demoirors ............ C08F 110/02 525/53 |
| 2011/0017661 A1 | 1/2011 | Kosar |
| 2011/0207841 A1* | 8/2011 | Kosar .................... B01D 71/34 521/134 |
| 2011/0226689 A1 | 9/2011 | Komori et al. |

FOREIGN PATENT DOCUMENTS

| | | |
|---|---|---|
| JP | 2003261697 | 9/2003 |
| WO | WO 03/050150 A1 | 6/2003 |
| WO | WO2010/032808 | 9/2009 |

OTHER PUBLICATIONS

Hedhli, Lotfi, etal. "Characteriation of randomly branched poly(vinylidene fluoride)", Macromolecules 41.6(2006):2011-2021.
Liu, Fu, etal. "Progress in the production and modification of PVDF membranes", Journal of Membrane Science 375.1 (2011): 1-27.

\* cited by examiner

FIGURE 1: Extensional viscosity
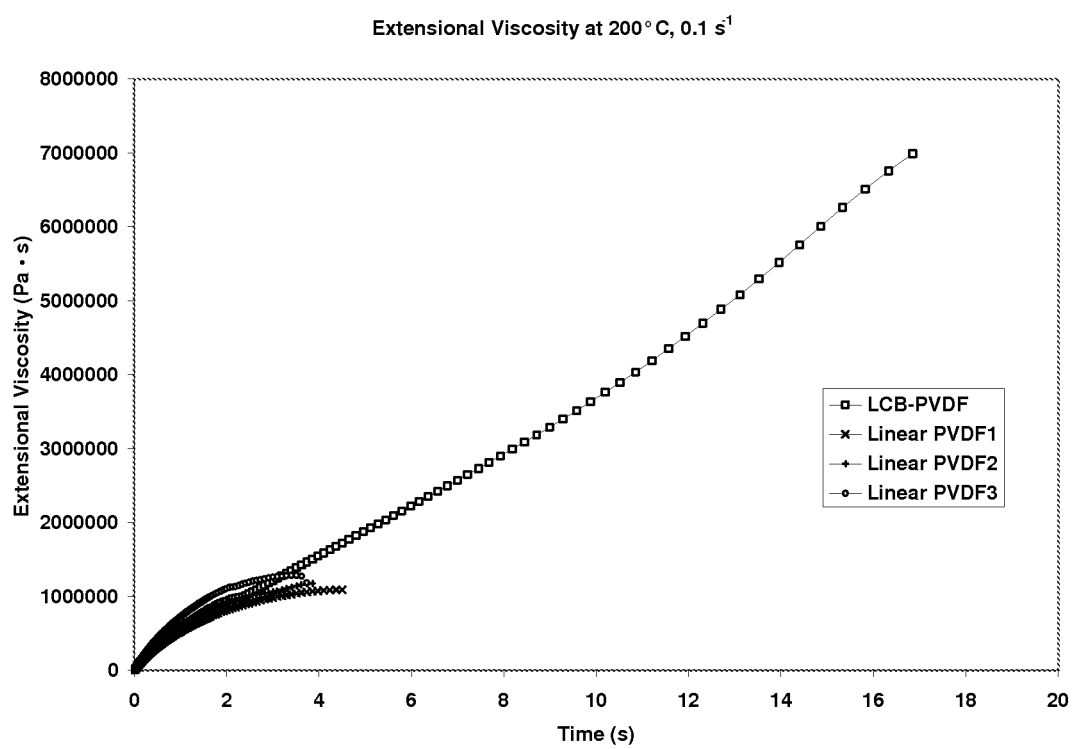

FIGURE 2: SEM cross sections for unsupported flat sheet membranes
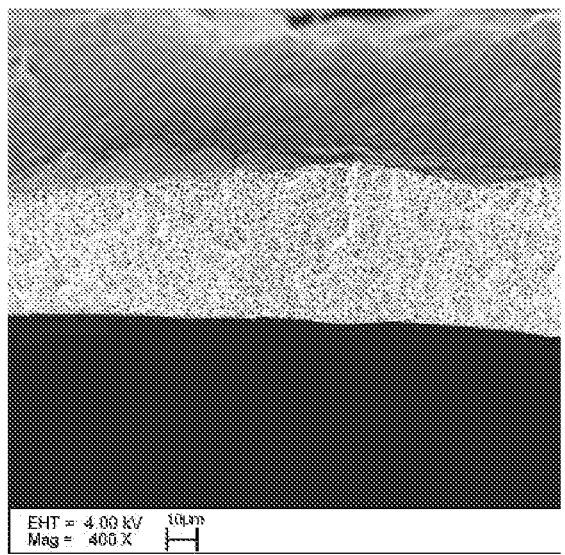
Linear PVDF 1 membrane
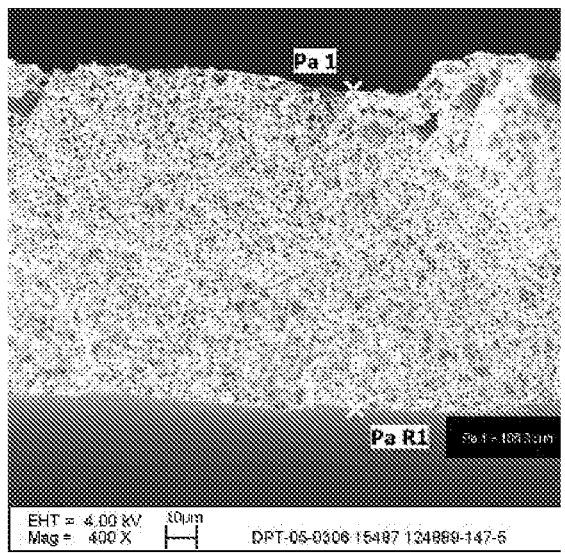
LCB-PVDF1 membrane FIGURE 3: SEM images of membrane surface 25,000x hollow fiber 1 (left) hollow fiber 2 (right)
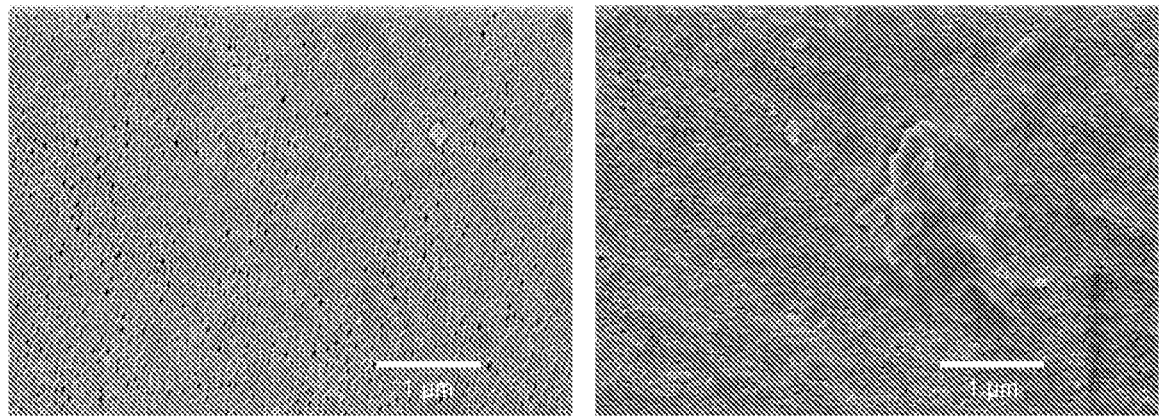
FIGURE 4: SEM image of hollow fiber 2 cross section near outer surface 1,500x
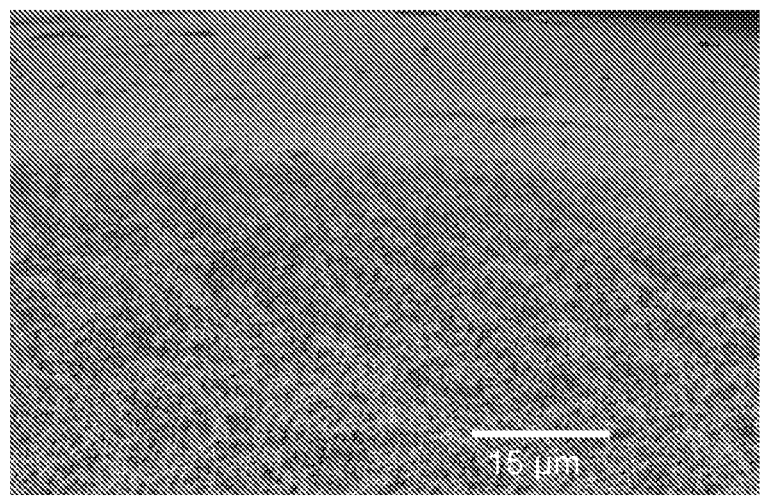

LONG CHAIN BRANCHED FLUOROPOLYMER MEMBRANES

This application claims benefit, under U.S.C. § 119 or § 365 of PCT Application Number PCT/US/2014/018882, filed Feb. 27, 2014, and U.S. Provisional Application No. 61/771,999, filed Mar. 4, 2013, said applications incorporated herein by reference.

FIELD OF THE INVENTION

The invention relates to membranes formed from long chain branched fluoropolymers, and especially long chain branched homopolymers and copolymers of polyvinylidene fluoride such as KYNAR resins. The novel membranes retain all the advantages of a fluoropolymer membrane (excellent chemical resistance especially to strong acids and oxidizing agents, and good mechanical strength), and additionally offer improved permeability, improved strain hardening, and even better resistance to caustic attacks. The improvements are believed to be related to an improvement to the microstructure of the membranes, producing a more open structure due to the long chain branched fluoropolymers. Further improvements in the mechanical properties of the membranes can be induced by strain hardening or drawing of the membrane.

BACKGROUND OF THE INVENTION

Fluoropolymer membranes, and especially polyvinylidene fluoride (PVDF) membranes have gained prominence in microfiltration water treatment membranes. These membranes may be used for diverse applications, including waste water treatment (both municipal and industrial), pre-filtration for reverse osmosis (RO) systems, and industrial water treatment. Fluoropolymer membranes have advantages over membranes formed from other membrane materials in terms of chemical resistance (especially to oxidizing agents and acids) and good mechanical strength. Hollow fiber and flat sheet (spiral wound) membranes can be fabricated from fluoropolymers, in a variety of pore sizes.

PVDF resin has the broadest range of chemical resistance of all polymer materials commonly used in water filtration membranes. However, PVDF has certain drawbacks as a membrane material. PVDF is a semi-crystalline polymer that will form dense, impermeable regions in the polymer matrix of membranes. One consequence of this is that PVDF ultrafiltration membranes have lower water flux than membranes made from other materials such as polyethersulfone. This is unfortunate since PVDF resin has the broadest range of chemical resistance of all polymer materials commonly used in water filtration membranes.

Water permeability is a key parameter of membrane performance and has a direct bearing on the overall cost of membrane filtration systems. A number of hydrophilic additives and post treatment chemistries have been reported for improving water permeability of PVDF membranes. There is still a need for improvement in porosity and water flux of PVDF membranes, especially for ultrafiltration membranes having very small pore sizes.

There are several methods currently used to form membranes, including TIPS and NIPS. Non-solvent induced phase separation (NIPS) is the most commonly used process, and involves forming a fluoropolymer solution, and casting this membrane solution into a non-solvent phase inversion bath. The solution phase inverts to produce a porous microstructure with controlled porosity.

Thermally induced phase separation (TIPS) is a process for making porous membranes by using rapid temperature change to induce phase separation in molten or gel-phase solution of a polymer and latent solvent and/or plasticizer. Upon cooling, the mixture becomes thermodynamically unstable with respect to demixing, and phase separation results. This process differs from non-solvent induced phase separation in that the phase separation is not driven by non-solvent influx. The TIPS process produces higher membrane mechanical strength due to higher solids content in the formulation and higher crystallinity. However, the TIPS process is complex and expensive to run because it requires operating temperatures at 200° C. or higher. These conditions require special equipment and safety protocols.

The introduction of long chain branches into the backbone of a polymer is known to effect rheological properties of the polymers. Long chain branched polyolefins have been studied extensively, for example: in WO 9612744 and Macromolecules (2003), 36(24), 9014-9019, where catalysts are used to create controlled long chain branched polyethylene by copolymerization of ethylene with higher alpha-olefins; in polycondensation polymers, where functional monomers are used to create long chain branching, as described in WO 2001066617; branched diacid chains as described in Polymer Preprints (ACS Polymer Chemistry) (2002), 43(2), 472-473; using radiation as in U.S. Pat. No. 7,514,480, and in polystyrene through the use of multifunctional initiators such as LUPEROX JWEB (Kasehagen et al., Society of Plastics Engineering, 2002 proceedings).

Long chain branched fluoropolymers are more difficult to produce, as the monomers are very sensitive to hydrogen abstraction and conventional approaches to branching in other monomer systems, such as described above, cannot necessarily be used. However, long chain branched fluoropolymers have been produced by reversible chain transfer based on iodine, as described in Macromolecular Symposia (2004), 206 (Polymer Reaction Engineering V), 347-360 and US 2004-0192868; by a transfer-to-polymer mechanism producing trifunctional long-chain branches (Macromolecules (2000), 33(5), 1656-1663); and through the use of low levels of radiation as disclosed in US patent application 2006-0287409.

Another method to produce long-chain branched fluoropolymers is disclosed in US2007/0106010, granted as U.S. Pat. No. 8,557,938, and this produces a long-chain branched fluoropolymer. PVDF with long chain branching utilized in the Examples of this application were produced as described in this patent application.

There is a need to produce a fluoropolymer membrane having a combination of a higher porosity, higher permeability, and improved mechanical properties.

Surprisingly, it has now been found that a fluoropolymer membrane, produced from long-chain branched fluoropolymers, provides improved flux and porosity when compared to membranes using typical linear fluoropolymers. Additionally, the novel membranes have better caustic resistance. The membranes formed from long-chain branched fluoropolymers are especially useful for ultra-filtration, where the fluoropolymer density is higher and the pore sizes are small. The long-chain branched fluoropolymers can be processed into membranes in the same manner as linear fluoropolymers (for example by a NIPS or TIPS process), allowing the new membrane compositions to be drop-in replacements in current membrane processes and applications.

While not being bound by any particular theory, it is believed that the presence of the long-chain branched (LCB) fluoropolymers creates a change in the microstructure of the membrane, leading to the performance improvements. The long chain branches alter the molecular size of the fluoropolymer in solution, compared to conventional linear fluoropolymers. This branched fluoropolymer produces a membrane with a more open and porous structure that result in better membrane flux

SUMMARY OF THE INVENTION

The invention relates to a membrane comprising from 5 to 100 weight percent of long-chain branched fluoropolymer. This membrane retains the excellent properties of a fluoropolymer, with improved permeability, strain hardening, and caustic resistance.

BRIEF DESCRIPTION OF THE DRAWINGS

FIG. 1: Is a plot showing the relationship between the extensional viscosity for samples containing the long-chain branched fluoropolymer of the invention, compared to membranes without long-chain branched fluoropolymer.

FIG. 2: shows SEM cross section images of an unbranched and long chain branched PVDF membrane.

FIGS. 3 and 4: shows SEM images of the cross section and outer surface of the hollow fiber membranes of Example 2.

DETAILED DESCRIPTION OF THE INVENTION

As used herein, unless otherwise indicated, molecular weight means weight average molecular weight, and percents are weight percents. All references cited are incorporated herein by reference.

Long chain branching is well known to one of ordinary skill in the polymer arts. As used herein "long chain branching" means that the average branch is larger than the critical molecular weight between entanglements. For a polyvinylidene fluoride polymer, this would be about 2,500 g/mole."

The term "membrane" is used to describe a porous membrane through which a fluid will passed, and is used to differentiate from a film designed to prevent fluid flow. The membrane may be in any form, with flat membranes and hollow fiber membranes being preferred.

The fluoropolymers of the invention are long-chain branched fluoropolymers, formed by any means known in the art, including the methods described in the Background section of this application.

The term fluoropolymer denotes any polymer that has in its chain at least one monomer chosen from compounds containing a vinyl group capable of opening in order to be polymerized and that contains, directly attached to this vinyl group, at least one fluorine atom, at least one fluoroalkyl group or at least one fluoroalkoxy group. Examples of fluoromonomers include, but are not limited to vinyl fluoride; vinylidene fluoride (VDF); trifluoroethylene (VF3); chlorotrifluoroethylene (CTFE); 1,2-difluoroethylene; tetrafluoroethylene (TFE); hexafluoropropylene (HFP); perfluoro(alkyl vinyl) ethers, such as perfluoro(methyl vinyl) ether (PMVE), perfluoro(ethyl vinyl) ether (PEVE) and perfluoro(propyl vinyl) ether (PPVE); perfluoro(1,3-dioxole); perfluoro(2,2-dimethyl-1,3-dioxole) (PDD). Preferred fluoropolymers, include hoomopolymers and copolymers of polyvinylidene fluoride (PVDF), ethylene tetrafluoroethylene (ETFE), terpolymers of ethylene with tetrafluoroethylene and hexafluoropropylene (EFEP), terpolymers of tetrafluoroethylene-hexafluoropropylene-vinyl fluoride (THV), copolymers of vinyl fluoride.

The PVDF may be a homopolymer, a copolymer (including terpolymers and 3 or more monomer units). PVDF copolymers of the invention are those in which vinylidene fluoride units comprise greater than 40 percent of the total weight of all the monomer units in the polymer, and more preferably, comprise greater than 70 percent of the total weight of the units, and may comprise greater than 75 and even greater than 80 weight percent of all monomers. Copolymers (including terpolymers and higher polymers) of vinylidene fluoride may be made by reacting vinylidene fluoride with up to 30 weight percent of one or more monomers from the group consisting of vinyl fluoride, trifluoroethene, tetrafluoroethene, one or more of partly or fully fluorinated alpha-olefins such as 3,3,3-trifluoro-1-propene, 1,2,3,3,3-pentafluoropropene, 3,3,3,4,4-pentafluoro-1-butene, and hexafluoropropene, the partly fluorinated olefin hexafluoroisobutylene, perfluorinated vinyl ethers, such as perfluoromethyl vinyl ether, perfluoroethyl vinyl ether, perfluoro-n-propyl vinyl ether, and perfluoro-2-propoxypropyl vinyl ether, fluorinated dioxoles, such as perfluoro(1,3-dioxole) and perfluoro(2,2-dimethyl-1,3-dioxole), allylic, partly fluorinated allylic, or fluorinated allylic monomers, such as 2-hydroxyethyl allyl ether or 3-allyloxypropanediol, and ethene or propene.

The invention will generally be described using PVDF as a representative fluoropolymer.

The fluoropolymer of the invention preferably is a gel-free polymer having long chain branching. By "gel-free", as used herein, is meant that the fluoropolymer contains less than 5 weight percent gels, preferably less than 2 weight percent gels, and most preferably less than 1 weight percent gels, based on the total weight of polymer. By gel is meant the fraction of polymer that is not soluble under standard solubilization conditions in conventional fluoropolymer solvents such as acetone, n-methyl pyrrolidone (NMP), or dimethylsulfoxide (DMSO), and N,N-dimethylformamide, (DMF). A gel-free polymer will produce a visually clear (not hazy) solution in any of the above solvents. The gel fraction is defined as the fraction of polymer retained after filtering through a 5 µm filter and standard gel permeation chromatography column.

The amount of long chain branching and the molecular weight of the fluoropolymer can be controlled, as known in the art, such as by adjusting the temperature, type of initiator(s), initiator feed rate, and catalyst, or post-polymerization radiation. The weight average molecular weight of the fluoropolymer is in the range of 20,000 to 2,000,000 g/mol, preferably 100,000 to 1,000,000 and most preferably from 500,000 to 800,000.

The PVDF used in the invention is generally prepared by means known in the art, using aqueous free-radical emulsion polymerization—although suspension, solution and supercritical $CO_2$ polymerization processes may also be used. In a general emulsion polymerization process, a reactor is charged with deionized water, water-soluble surfactant capable of emulsifying the reactant mass during polymerization and optional paraffin wax antifoulant and catalyst. The mixture is stirred and deoxygenated. A predetermined amount of chain transfer agent, CTA, is then introduced into the reactor, the reactor temperature raised to the desired level and vinylidene fluoride (and possibly one or more comonomers) are fed into the reactor. Once the initial charge of vinylidene fluoride is introduced and the pressure in the reactor has reached the desired level, an initiator emulsion or solution is introduced to start the polymerization reaction.

The temperature of the reaction can vary depending on the characteristics of the initiator used and one of skill in the art will know how to do so. Typically the temperature will be from about 30° to 150° C., preferably from about 60° to 120° C. Once the desired amount of polymer has been reached in the reactor, the monomer feed will be stopped, but initiator feed is optionally continued to consume residual monomer. Residual gases (containing unreacted monomers) are vented and the latex recovered from the reactor.

The surfactant used in the polymerization can be any surfactant known in the art to be useful in PVDF emulsion polymerization, including perfluorinated, partially fluorinated, and non-fluorinated surfactants. Preferably the PVDF emulsion of the invention is fluorosurfactant free, with no fluorosurfactants being used in any part of the polymerization.

The long chain branched fluoropolymer produced by the process of the invention has enhanced rheological properties compared to linear fluoropolymers. These properties are characterized by a viscosity profile showing a lower onset of shear thinning, a lower power-law index "n" (in the range of from 0.25 to 0.5), a higher melt strength for an equivalent molecular weight and a higher drawdown ratio. In addition, the solid-state properties such as modulus and tensile strength remain similar to conventional fluoropolymers containing $VF_2$ monomer.

The long chain branched fluoropolymer of the invention has a radius of gyration that is less than the radius of gyration of a similar composition linear fluoropolymer of the same weight average molecular weight, as measured by multi angle light scattering.

The long chain branched fluoropolymer polymer(s) may be the only fluoropolymer in the membrane composition, or it may be blended with linear, non-branched fluoropolymer. The linear fluoropolymers may be of the same chemical composition as the long chain branched fluoropolymers or may be of a different composition—either different copolymers having the same primary fluoromonomer, or a blend containing fluoropolymer s with a different primary fluoromonomer. The branched fluoropolymer can be present in the fluoropolymer blend with linear fluoropolymer(s) at from 10 weight percent of the total fluoropolymer in the formulation, up to 100 weight percent, preferably at from 20 to 80 weight percent, and more preferably at from 30 to 100 weight percent, based on the weight of the total fluoropolymer. In the total membrane solids formulation, 50 weight percent to 100 weight is fluoropolymer.

The long chain branched fluoropolymer can be blended with one or more acrylic polymers. By "acrylic polymers", is meant polymers, copolymers and terpolymers formed from alkyl methacrylate and alkyl acrylate monomers, and mixtures thereof. Preferably, any acrylic polymer is a random or block copolymer containing 70 to 99, and more preferably 90-99 weight percent of methyl methacrylate units, and from 1 to 30, and more preferably 1 to 10 weight percent of one or more $C_{1-4}$ alkyl acrylate units. In general, the acrylic polymers have molecular weights in the range of from 30,000 to 500,000. If the molecular weight of the acrylic polymer(s) is too high, the polymer will be too brittle for use in the membrane. The acrylic polymer may be present at from 0-49, more preferably 0-25 weight percent, 2-40 weight percent and may be used in the 5-25 weight percent range, based on the total non water-soluble polymer solids in the formulation. In one embodiment, the acrylic polymer contains up to 30 weight percent. and preferably up to 10 weight percent of (meth)acrylic acid monomer units.

In addition to the fluoropolymer, acrylic polymer and solvent, other additives may be added to the membrane composition, typically at from 1 to 20 weight percent and more preferably from 5 to 10 weight percent, based on the total solids composition. Typical additives include, but are not limited to, water-soluble pore-formers which are typically hydrophilic water extractable compounds such as metallic salts (such as lithium, calcium and zinc salts), alcohols, glycols (such as polyethylene glycol, polypropylene glycol, and glycerol); silica, carbon nanotubes and other nano materials which may or may not be extracted; and compounds for increasing the viscosity of the solution for ease in processing of membrane materials. Other hydrophilic additives include polyvinylpyrrolidone, poly-2-ethyl-oxazoline, polyvinylacetate, and polyvinyl alcohol.

The long chain branched fluoropolymer membrane composition components may be blended together followed by dissolution, or the polymers and additives may be separately dissolved in the same or different solvents, and the solvent solutions blended together. Solvents useful in dissolving the solutions of the invention include, but are not limited to N,N-dimethylacetamide, N,N-diethylacetamide, N-methyl-2-pyrrolidone, N-ethyl-2-pyrrolidone, acetone, dimethyl formamide, tetrahydrofuran, methyl ethyl ketone, tetramethyl urea, dimethyl sulfoxide, triethyl phosphate, N-octyl-pyrrolidone, gamma butyrolacetone, N,N'dimethyl-trimethylene-urea, dimethylcarbonate, and mixtures thereof.

The fluoropolymer solution composition typically has a solids level of from 10 to 35 percent, preferably 15 to 22 and most preferably from 17 to 20 percent. The solution is formed by admixing and optionally heating at a temperature up to 80° C., and typically from 50 to 80° C.

The solution viscosity can be adjusted to obtain the best processing condition. For flat sheet, the overall formulation is adjusted to obtain the best viscosity for a flat web casting. In hollow fiber formation, the process is actually a form of extrusion, and higher viscosities can be beneficial.

The long chain branched fluoropolymer solution is then formed into membranes by typical processes known in the art, to form a flat sheet, supported flat sheet or hollow fiber membrane. In one typical process, the solution is solvent cast and drawn down onto a substrate. This membrane may be supported or unsupported, such as being cast onto a porous support web such as a woven or non-woven polyolefin or polyester. The membrane is then formed by a phase separation process, in which the thermodynamics of the cast membrane solution are disrupted, so that the polymer gels and phase separates from the solvent (NIPS). The change in thermodynamics is often begun by a partial solvent evaporation, and/or exposure of the film to a high humidity environment. The membrane is then placed in a non-solvent for the polymer—such as water, an alcohol, a mixture thereof, or a mixture of water and solvent used for dissolving PVDF,—and the solvent removed, leaving a porous membrane. The pore size can be adjusted through the use of additives and the polymer concentration as known in the art. For example high molecular weight additives can lead to large pore sizes, while the use of lithium salt additives can produce small pore sizes.

The membranes of the invention can also be made from a thermally induced phase inversion process (TIPS) as previously described.

The final dry thickness of the membranes of this invention are generally between 50 to 500 microns, and preferably from 100 to 250 microns. This can be measured using a cryofractured membrane in an scanning electron microscope, or an optical microscope using a calibrated eye-piece or sizing software.

The LCB PVDF (long chain branched polyvinylidene fluoride) membranes of the invention strain hardens to a much greater degree than conventional linear PVDF. The term "strain hardening" as used herein, refers to the ability of the material to resist uniaxial or biaxial stretching beyond a certain strain value. Strain hardening is often used to increase the strength of polymer films by stretching and orienting the polymer chains and drawing out the crystalline regions. Stretching also serves to further entangle the polymer chains. Strain hardening allows one to obtain a stronger polymer film while using a lower viscosity resin that is easier to process. One benefit to a lower viscosity resin is that lower processing conditions may be used. Strain hardening characteristics can be measured by extensional viscosity measurements as shown in FIG. 1.

In a hollow fiber process, strain hardening can be induced by extruding the fibers at one rate, and having the take-up mechanism at a faster rate, causing stretching/orientation (draw or extend) and providing better mechanical properties. The strain hardened long-chain branched membranes show a much higher elongation at break, and also better tensile strength.

Membranes produced from LCB-PVDF have all the benefits of unbranched PVDF but with better permeability and strain hardening characteristics. They also show enhanced gas permeability and more homogeneous pore distribution.

Further, the LCB-PVDF has improved resistance to caustic attack. While not being bound to any particular theory, this results from the more irregular chain structure of the long-chain branched polymer preventing unzipping of the polymer by caustic attack. Caustic exposure studies showed much less darkening of LCB-PVDF membrane compared to regular PVDF. Darkening is an indication of dehydrofluorination of the polymer. Since sodium hydroxide solution is often used in membrane cleaning cycles, degradation of PVDF membranes by repeated cleaning cycles is one limitation to greater use of this of membrane. Therefore, the improved caustic resistance of the branched fluoropolymer membrane is another advantage over linear PVDF.

The membranes of the invention are useful for filtration of particulate matter suspended in liquid and gas dispersions or suspensions. They are especially useful in harsh environments, or where there is exposure to caustic materials during filtration, or in the cleaning and maintenance of the filter. The membranes of the invention may be used in many applications, including but not limited to: water purification, purification of biological fluids, wastewater treatment, osmotic distillation, and process fluid filtration.

EXAMPLES

The following test methods were used:

Melt viscosity (MV): ASTM method D3835 (capillary rheometry). Measurements are reported at 232° C., 100 s$^{-1}$. Values are reported in kilopoise (kP).

Capillary Flow Porometry: ASTM F316-03 "Standard Test Methods for Pore Size Characteristics of Membrane Filters by Bubble point and Mean Pore Test"

Bubble point diameter: ASTM 316-03 and ASTM E128 99 (2011) "Standard Test Method for Maximum Pore Diameter and Permeability of Rigid Porous Filters for Laboratory Use"

Pore diameter: ASTM F316 03 and ASTM E128 99 (2011)

Gas permeability: ASTM F316 03

Tensile Strength: Instron 4201 universal testing machine, equipped with monofilament grips, grip spacing 125 mm, strain rate 100% min$^{-1}$.

Extensional viscometry: Experiments were conducted on a TA instruments ARES_LS strain rheometer installed with an extensional viscosity fixture (EVF). Transient extensional measurements were done at either 190° C. or 200° C. at a strain rate of 0.1 s$^{-1}$. Test specimens were prepared using a hydraulic press at 200° C. Extensional viscosity samples are 10 mm wide 18 mm long and 0.66 mm thick.

The following materials were used:
DMAC=N,N-Dimethylacetamide
NMP=N-Methyl-2-pyrrolidone
LCB-PVDF1: Is long chain branched PVDF with a $M_w$~350 kDa $M_w$, and melt viscosity of 22 kP
LCB-PVDF2: Is long chain branched PVDF with a $M_w$~550 kDa, and a melt viscosity of 38 kP
Linear PVDF1: Is unbranched PVDF with a Mw of ~400 kDa and a melt viscosity of 26 kP.
Linear PVDF2: Is unbranched PVDF with a Mw~500 kDa, and a melt viscosity of 34 kP.
Linear PVDF3: Is unbranched PVDF with a Mw~600 kDa, and a melt viscosity of 37 kP.
Polyethylene glycol (PEG): The preceding number describes the nominal molecular weight in g mol$^{-1}$.
Polyvinylpyrrolidone (PVP): grades K17, K30, and K90 have molecular weights of approximately 10, 40, and 1000 kDa respectively.

By unbranched or linear PVDF is meant that some branching may occur, but any branching is less than the amount to meet the minimum definition of long chain branching, as defined in this application.

Example 1

Flat sheet Membranes were prepared using the following formulations:

TABLE 1

Formulations used to make flat sheet PVDF membranes

| Ingredient | Formulation 1 | Formulation 2 | Formulation 3 | Formulation 4 |
|---|---|---|---|---|
| PVDF Resin | 15.0% | 15.0% | 18.0% | 18.0% |
| Solvent | 77.0% (DMAC) | 76.5% (DMAC) | 73.5% (DMAC) | 78.4% (NMP) |
| PEG 400 | 2.5% | 5.0% | 5.0% | |
| PEG 1000 | | 2.5% | 2.5% | |
| PEG 8000 | 2.5% | | | |
| Water | 3.0% | | | |
| LiCl | | 1.0% | 1.0% | 3.6% |

Polymer and additives were dissolved in DMAC by heating to 70° C. and stirring with an overhead stirrer for 1 hour. After cooling, the membrane solution was drawn down on polypropylene sheet at 15 mils wet thickness. The wet membranes were exposed to 95% humidity for 1-2 minutes, followed by immersion in a 50° C. water bath. The membrane solidified within 2 minutes, and was easily removed from the polypropylene sheet.

The membranes were soaked for 30 minutes in the 50° C. water bath followed by 30 minutes in a deionized water bath at 20° C., and finally for 30 minutes in isopropanol at 20° C. The membranes were allowed to air dry and were further dried by heating in an oven at 160° F. for 1 hour.

Membranes were characterized by capillary flow porometry and imaged by SEM. Caustic exposure studies were carried out by immersing the membrane samples in either 5% sodium hydroxide solution at 50° C. for two weeks or 30% caustic solution for 1 week. The exposed membranes were rinsed in clean water then dried. Color changes (ΔE*) were measured using a Hunter Colorimeter.

FIG. 2 shows SEM cross section images of an unbranched PVDF 1 and LCB-PVDF1 membranes. Formulation #1 was used for these membranes. These side-by-side images were taken at the same magnification and are at the same scale. It can be seen that the long chain branched PVDF membrane has a much fuller, porous structure. The unbranched PVDF membrane has a cross sectional thickness of ~½ that of the LCB-PVDF. Since the formulations are identical, this demonstrates a higher porosity of the branched PVDF (LCB-PVDF1) membrane compared with the membrane made from linear PVDF Capillary Flow Porometry (Table 2) clearly shows larger bubble point and mean pore diameters for the long chain branched PVDF compared to linear PVDF. This would be expected to translate into superior membrane flux. Also, the long chain branched PVDF has a more uniform pore distribution, as evidenced by the lower ratio of bubble point diameter to mean pore diameter. Bubble point diameter (BPD) is the largest restrictive pore opening in the membrane. The mean pore diameter (MPD) is an average pore size calculated by the half dry method as described in ASTM F316-03. The smaller this ratio is, the more uniform the pore size distribution is. More uniform pore size distribution gives a more efficient membrane.

TABLE 2

Capillary Flow Porometry Data for LCB and Linear PVDF Membranes

| Membrane | Formulation | BPD um | MPD um | BPD/MPD | Gas Permeability Darcys × 10$^{-4}$ |
|---|---|---|---|---|---|
| Linear PVDF 1 | 1 | 0.168 | <0.016 (BD) | >10 | 1.567 |
| LCB-PVDF 1 | 1 | 0.226 | 0.0303 | 7.45 | 7.536 |
| Linear PVDF2 | 2 | 0.122 | 0.0165 | 8 | 0.558 |
| LCB-PVDF2 | 2 | 0.317 | 0.107 | 2.96 | 1.530 |
| Linear PVDF2 | 3 | 0.068 | <0.012 | >5.5 | 0.294 |
| LCB-PVDF2 | 3 | 0.121 | 0.0224 | 5.4 | 1.161 |
| Linear PVDF2 | 4 | 0.118 | <<0.013 | —* | 0.349 |
| LCB-PVDF2 | 4 | 0.179 | <0.013 | —* | 0.602 |

*Mean pore size could not be estimated accurately enough for meaningful comparison.

The gas permeability (for air) using ASTM F316-03 is given in the last column of the table. The higher this value, the more permeable the membrane is. In all cases, the long chain branched PVDF has a higher permeability than unbranched PVDF.

Color change data for PVDF resins after one week caustic exposure:

TABLE 3

Color change after 1 week caustic exposure

| PVDF | ΔE* |
|---|---|
| Linear PVDF 1 | 63.25 |
| Linear PVDF 2 | 62.23 |
| LCB-PVDF 1 | 53.14 |

As can be seen from the data, long chain branched PVDF offers advantages for porous membranes by having greater gas permeation flux and superior caustic resistance.

Example 2

Membrane formulations were prepared by mixing 17.5 wt. % PVDF and 10 wt. % PVP K17 in NMP. The formulations were stirred in an overhead mixer at 70° C. for four hours, and allowed to cool overnight to room temperature. The membrane solution was drawn down on a non-woven polyester support fabric sheet at 15 mils wet thickness, then immediately immersed in a blend of 60% isopropanol 40% water at 20° C. After two minutes, the membranes were removed from the isopropanol solution and soaked in room temperature deionized water overnight. Samples for capillary flow porometry were air and oven dried like those in Example 1, the water permeability samples remained wet through testing.

Water permeation was performed on a 47 mm disc in dead end mode at room temperature using an automated liquid penetrometer from Porous Materials Incorporated, Ithaca, N.Y. The pressure was ramped from 0-1 bar, and the average permeability over this range was calculated in (1·m$^2$·hr$^{-1}$·bar$^{-1}$). Capillary flow porometry was performed in accordance with ASTM F316-03 on membranes that had been air and oven dried as in Example 1.

Pore size and permeability data are shown in Table 4 for these supported flat sheet membranes. The higher permeability of the LCB PVDF membranes is clear. Table 4 shows permeability data for hollow fiber membranes made with linear and LCB PVDF, and again the permeability advantage of LCB PVDF is evident. In this example the membrane prepared with a blend of LCB and linear PVDF had much higher permeability at equivalent pore size

TABLE 4

Comparison of Pore Size and Water Permeability for LCB and Linear PVDF Membranes

| Property | LCB-PVDF2 | LCB-PVDF2 40%-Linear-PVDF2 60% | Linear PVDF 1 | Linear PVDF 2 |
|---|---|---|---|---|
| bubble point diameter (μm) | 0.202 | 0.134 | 0.128 | 0.104 |
| mean pore diameter (μm) | 0.0754 | 0.0521 | 0.0501 | 0.0457 |
| pure water permeability (1·m$^2$·hr$^{-1}$·bar$^{-1}$) | 696 | 442 | 167 | 137 |

Example 3

Hollow fiber membranes were prepared with the following components by weight:

TABLE 5

Hollow fiber membrane formulations

| Ingredient | hollow fiber 1 | hollow fiber 2 |
|---|---|---|
| PVDF Resin | 18.0% Linear PVDF 3 | 18.0% LCB-PVDF 2 |
| DMAC | 61.0% | 61.0% |
| Glycerin | 6.0% | 6.0% |
| PVP K90 | 7.5% | 7.5% |
| PVP K30 | 7.5% | 7.5% |

The components were blended in an overhead mixer at 70° C. for 5 hours, and then allowed to rest overnight in an oven at 70° C. The membrane formulations were then pumped through an annular die with an overall diameter of 2.0 mm and a needle outside diameter of 0.8 mm, through an air gap of 3 cm, and into a water coagulation bath. The bore liquid contained (by weight): 50% DMAC, 15% glycerin, and 35% water. The die and transfer lines were heated to 70° C., and the coagulation bath was heated to 55° C. The nascent membranes were drawn through the coagulation bath with a path length of 2 meters at 15 m·min$^{-1}$ before being collected on a take up spool partially immersed in water. The membrane dope flow rate was varied to produce membranes with a final wet wall thickness ranging between approximately 200 and 450 μm, while the bore fluid flow rate was held constant. The fiber membranes were drawn down from an initial outside diameter of 2 mm to a final wet outside diameter of 1.3 to 1.4 mm. This drawing may serve to orient and strain harden the polymer chains.

After a through washing in deionized water overnight at ambient temperature, the membranes were subjected to a post treatment with 2% sodium hypochlorite solution for 4 hours at ambient temperature. The membranes were soaked again in deionized water at ambient temperature for 1 hour before potting with a fast setting epoxy in test modules containing an outside surface area of approximately 0.006 m$^2$. Membranes remained wet through the potting and permeability testing process.

Pure water permeability of the treated membranes was performed in dead end mode at 0.25, 0.50, and 0.75 bar. Permeability is calculated as the slope of a line through these points and origin. A summary of the permeability testing is shown in Table 6. SEM micrographs were taken of the membrane cross section and outer surface, as seen in FIGS. 3 and 4. The tensile strength and elongation to break of the hollow fiber membranes was tested before and after immersion in a pH 13 buffer solution of sodium hydroxide at 40° C. for 10 days, these results are displayed in Table 7.

TABLE 6 hollow fiber permeability results

| hollow fiber 1 | | | |
|---|---|---|---|
| wall thickness (μm) | 236 | 354 | 425 |
| pure water permeability (l · m$^{-2}$ · hr$^{-1}$ · bar$^{-1}$) | 1030 | 620 | 280 |
| hollow fiber 2 | | | |
| wall thickness (μm) | 280 | 337 | 396 |
| pure water permeability (l · m$^{-2}$ · hr$^{-1}$ · bar$^{-1}$) | 1140 | 1110 | 1220 |

TABLE 7 tensile properties of hollow fiber membranes before and after caustic exposure

| | unexposed | 10 days @ pH 13 |
|---|---|---|
| hollow fiber 1 | | |
| tensile strength (MPa) | 3.01 | 2.00 |
| elongation to break | 149% | 48% |
| hollow fiber 2 | | |
| tensile strength (MPa) | 2.65 | 1.89 |
| % elongation to break | 151% | 94% |

The hollow fiber membrane prepared with LCB-PVDF2 had a higher initial flux over a wide range of wall thicknesses, indicative of a more open and interconnected internal pore structure. The LCB-PVDF2 example also maintained better elasticity after caustic exposure, which may be a result of increased chain entanglements or the more irregular structure of LCB-PVDF.

Extensional Viscosity measurements were run on dense film polymer samples of LCB PVDF and linear PVDF. We compared comparable PVDF grades based on Mw determined by gel permeation chromatography. The results show that the LCB PVDF has a much higher strain hardening than the others.

Extensional viscosity testing was carried out on several LCB and linear PVDF samples. This information confirms the superior strain hardening of LCB PVDF compared to linear PVDF. The data are presented in Table 8, and FIG. 1.

TABLE 8

| Extensional viscosity | |
|---|---|
| Sample | Extensional viscosity (Pa · s) at 200° C.; 0.1 s$^{-1}$ |
| LCB-PVDF2 | 6.989 × 10$^6$ |
| L-PVDF 1 | 1.0857 × 10$^6$ |
| L-PVDF 2 | 1.1713 × 10$^6$ |
| L-PVDF 3 | 1.2848 × 10$^6$ |

What is claimed is:

1. A porous membrane consisting of
a) fluoropolymers wherein said fluoropolymers are selected from the groups consisting of i) long-chain branched polyvinylidene fluoride homopolymer or copolymer and ii) optionally linear fluoropolymer and combinations thereof, wherein the weight percent of long-chain branched polyvinylidene fluoride homopolymer or copolymer is from 5 to 100 weight percent based on total fluoropolymer in said membrane and the weight percent of linear fluoropolymer is from 0 to 95 weight percent based on total fluoropolymer in said membrane,
b) from 0 to 49 weight percent random acrylic copolymers based on total polymer in the membrane and
c) optionally from 1 to 20 weight percent of other additives, selected from the group consisting of pore-formers, viscosity modifiers, polyvinylpyrrolidone, poly-2-ethyloxazoline, polyvinylacetate, and polyvinyl alcohol.

2. The membrane of claim 1 wherein the weight percent of said long-chain branched polyvinylidene fluoride homopolymer or copolymer is from 10 to 80 weight percent based on total fluoropolymer in the membrane.

3. The membrane of claim 2, wherein said long-chain branched polyvinylidene fluoride homopolymer or copolymer comprises from 70 to 99.9 weight percent of vinylidene fluoride monomer units and from 0.1 to 30 weight percent of one or more other fluoromonomer units.

4. The membrane of claim 1, wherein said membrane is a flat membrane or a hollow fiber membrane.

5. The membrane of claim 4, wherein said membrane has a thickness of from 50 to 500 microns.

6. The membrane of claim 1, wherein said membrane further consists of from 20 to 90 weight percent of a linear fluoropolymer based on total fluoropolymer in the membrane.

7. The membrane of claim 6 wherein said linear fluoropolymer is a vinylidene fluoride homopolymer or a copolymer comprising from 70 to 99.9 weight percent of vinylidene fluoride monomer units and from 0.1 to 30 weight percent of one or more other fluoromonomer units.

8. The membrane of claim 1, wherein the random acrylic polymer is linear and comprises from 2 to 40 weight percent of the polymer in the membrane.

9. The membrane of claim 8, wherein said random acrylic polymer comprises (meth)acrylic monomer units.

10. The membrane of claim 1, wherein the pore formers are selected from the group consisting of metallic salts, alcohols, glycols and silica.

11. The membrane of claim 1, wherein said membrane has been strain hardened.

12. The membrane of claim 1 wherein the bubble point of the porous membrane is at least 1.35 times the bubble point of the same membrane made using linear polyvinylidene fluoride polymer in place of the long chain branched polyvinylidene fluoride homopolymer or copolymer in the membrane.

13. The membrane of claim 1 wherein the membrane is formed by a phase separation process.

14. A porous membrane consisting of:
from 5 to 100 weight percent of a long-chain branched polyvinylidene fluoride homopolymer or copolymer in said membrane;
from 0 to up to 95 weight percent of a linear fluoropolymer based on total fluoropolymer in the membrane, wherein said linear fluoropolymer consists of monomers selected from the group consisting of vinyl fluoride; vinylidene fluoride (VDF); trifluoroethylene (VF3); chlorotrifluoroethylene (CTFE); 1,2-difluoroethylene; tetrafluoroethylene (TFE); hexafluoropropylene (HFP); perfluoro(alkyl vinyl) ethers, such as perfluoro(methyl vinyl) ether (PMVE), perfluoro(ethyl vinyl) ether (PEVE) and perfluoro(propyl vinyl) ether (PPVE); perfluoro(1,3-dioxole); perfluoro(2,2-dimethyl-1,3-dioxole) (PDD); and optionally other additives selected from the group consisting of pore-formers, viscosity modifiers, polyvinylpyrrolidone, poly-2-ethyloxazoline, polyvinylacetate, and polyvinyl alcohol.

15. A porous membrane consisting of long-chain branched polyvinylidene fluoride homopolymer or copolymer, linear fluoropolymer, random linear acrylic copolymers and optionally from 1 to 20 weight percent of other additives selected from the group consisting of pore-formers, viscosity modifiers, polyvinylpyrrolidone, poly-2-ethyloxazoline, polyvinylacetate, and polyvinyl alcohol.

* * * * *